United States Patent
Pajovic et al.

(10) Patent No.: US 9,282,531 B1
(45) Date of Patent: Mar. 8, 2016

(54) METHOD AND SYSTEM FOR LOCALIZATION OF A DEVICE IN AN ENCLOSED ENVIRONMENT BASED ON RECEIVED SIGNAL STRENGTH LEVELS

(71) Applicant: Mitsubishi Electric Research Labs., Inc., Cambridge, MA (US)

(72) Inventors: Milutin Pajovic, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/634,977

(22) Filed: Mar. 2, 2015

(51) Int. Cl.
*H04W 24/00* (2009.01)
*H04W 64/00* (2009.01)
*H04B 17/318* (2015.01)
*H04W 84/12* (2009.01)

(52) U.S. Cl.
CPC .............. *H04W 64/00* (2013.01); *H04B 17/318* (2015.01); *H04W 84/12* (2013.01)

(58) Field of Classification Search
CPC .. H04W 64/00; H04W 4/02; H04L 29/08657; H04M 1/72519; G01C 21/26
USPC ..................... 455/456.6, 456.5, 456.1, 550.1; 701/408
See application file for complete search history.

(56) References Cited

U.S. PATENT DOCUMENTS

| | | | |
|---|---|---|---|
| 7,035,632 B2* | 4/2006 | Gutowski | H04W 24/00 455/422.1 |
| 7,317,419 B2 | 1/2008 | Sugar et al. | |
| 7,941,163 B2* | 5/2011 | Margrave | H04W 64/00 455/226.2 |
| 8,077,090 B1 | 12/2011 | Chintalapudi et al. | |
| 8,264,402 B2 | 9/2012 | Kaiser et al. | |
| 8,620,301 B1* | 12/2013 | Hessel | H04W 16/18 455/277.2 |
| 8,879,607 B2 | 11/2014 | Skarp | |
| 2010/0208603 A1* | 8/2010 | Ishii | H04B 1/7113 370/252 |
| 2011/0092210 A1* | 4/2011 | Kumar | H04W 36/0083 455/436 |
| 2011/0250891 A1* | 10/2011 | Zou | H04W 36/04 455/437 |
| 2012/0100870 A1* | 4/2012 | Prost | G01S 5/02 455/456.1 |
| 2012/0129546 A1* | 5/2012 | Yang | G01S 5/0252 455/456.1 |
| 2013/0273937 A1* | 10/2013 | Nakahara | G01S 19/35 455/456.1 |

* cited by examiner

Primary Examiner — Danh Le
(74) Attorney, Agent, or Firm — Gene Vinokur; Dirk Brinkman

(57) ABSTRACT

A method and system determines a location of a device by first measuring, in a receiver of the device, received signal strength (RSS) levels of reference signals transmitted by a set of access points (APs) arranged in an enclosed environment. An expectation maximization procedure is initialized with a uniform distribution of path loss coefficients of the set of APs. An expectation of a joint log-likelihood of the RSS levels is evaluated with respect to the uniform probability distribution of the path loss coefficients, and then updated iteratively until a termination condition is satisfied to produce final path loss coefficients. The location of the device is then based on the RSS levels and the final path loss coefficients.

12 Claims, 9 Drawing Sheets

Data: RSS measurements $z_j, j = 1, \ldots, N$
Result: Location estimate $\hat{x}$
$p_j^{(0)}(h) = \frac{1}{|\mathcal{H}|}, j = 1, \ldots, N, h \in \mathcal{H}$ ;
for $k = 1 : I$ do $\hat{x}^{(k)} = \underset{x}{\arg\min} \sum_{j=1}^{N} \sum_{h \in \mathcal{H}} p_j^{(k-1)}(h) \left( z_j - z_0^R + 10 h_j \log_{10} \frac{\|x - x_j\|}{d_0} \right)^2$ ;

$p_j^{(k)}(h) \propto \exp\left\{ -\frac{1}{2\sigma_\phi^2} \left( z_j - z_j^R + 10 h \log_{10} \frac{\|\hat{x}^{(k)} - x_j\|}{d_0} \right)^2 \right\}$ ;

end

*Fig. 2B*

Data: $\hat{x}(n-1)$, $\Delta x(n)$ and $z_j(n)$, $j = 1, \ldots, N$
Result: Location estimate $\hat{x}(n)$ if $n = 1$ then
$\quad p_j^{(0)}(h) = \frac{1}{|\mathcal{H}|}$ ;
else
$\quad p_j^{(0)}(h) \propto \exp\left\{-\frac{1}{2\sigma_z^2}\left(z_j - z_j^R + 10h\log_{10}\frac{\|\hat{x}(n-1)+\Delta x(n)-x_j\|}{d_0}\right)\right\}$ ;
end for $k = 1 : I$ do
$\quad \hat{x}^{(k)} = \underset{x}{\operatorname{argmin}} \sum_{j=1}^{N} \sum_{h \in \mathcal{H}} p_j^{(k-1)}(h)\left(z_j - z_j^R + 10h_j\log_{10}\frac{\|x - x_j\|}{d_0}\right)^2$ ;
$\quad p_j^{(k)}(h) \propto \exp\left\{-\frac{1}{2\sigma_z^2}\left(z_j - z_j^R + 10h\log_{10}\frac{\|\hat{x}^{(k)} - x_j\|}{d_0}\right)\right\}$ ;
end

*Fig. 3C*

Data: $\check{x}_f(n-1)$, $\Delta x(n)$, $\Sigma(n-1)$ and $z_j(n), j = 1, \ldots, N$

Result: Location estimate $\check{x}_f(n)$ and covariance $\Sigma(n)$

Predicted mean: $\tilde{x}(n) = \check{x}_f(n-1) + \Delta x(n)$ ;

Predicted covariance: $\tilde{\Sigma}(n) = \Sigma(n-1) + \sigma_o^2 \mathbf{I}$ ;

Initialize: $p_j^{(0)}(h) \propto \exp\left\{-\frac{1}{2\sigma_z^2}\left(z_j - z_f^R + 10h_j \log_{10}\frac{\|\tilde{x}(n) - x_j\|}{d_0}\right)^2\right\}$ ;

for $k = 1 : I$ do

$\quad x^{(k)} = \underset{x}{\operatorname{argmin}} \sum_{j=1}^{N} \sum_{h \in H} p_j^{(k-1)}(h) \left(z_j - z_f^R + 10h_j \log_{10}\frac{\|x(n) - x_j\|}{d_0}\right)^2$ $\quad p_j^{(k)}(h) \propto \exp\left\{-\frac{1}{2\sigma_z^2}\left(z_j - z_f^R + 10h_j \log_{10}\frac{\|\check{x}^{(k)}(n) - x_j\|}{d_0}\right)^2\right\}$ ;

end

Evaluate $\mathbf{J}$ using (15) at $\check{x}^{(I)}(n)$ and hard estimates of $h_j$'s ;

Evaluate $\mathbf{T} = \left(\tilde{\Sigma}(n) + \mathbf{J}^{-1}\right)^{-1} \tilde{\Sigma}(n)$ ;

Update mean: $\check{x}_f(n) = \tilde{x}(n) + \left(\check{x}^{(I)}(n) - \tilde{x}(n)\right)\mathbf{T}$ ;

Update covariance: $\Sigma(n) = \tilde{\Sigma}(n)(\mathbf{I} - \mathbf{T})$ ;

*Fig. 4B*

METHOD AND SYSTEM FOR LOCALIZATION OF A DEVICE IN AN ENCLOSED ENVIRONMENT BASED ON RECEIVED SIGNAL STRENGTH LEVELS

FIELD OF THE INVENTION

The invention relates generally to indoor localization, and more particularly to unsupervised localization of a device using received signal strength (RSS) measurements.

BACKGROUND OF THE INVENTION

Accurate indoor localization using a satellite based Global Positioning System (GPS) is difficult to achieve because the GPS signals are attenuated when the signals propagate through obstacles, such as roof, floors, walls and furnishing Consequently, the signal strength becomes too low for localization in indoor environments.

A number of methods and systems are known for indoor localization. Most prior art techniques require that specialized hardware is installed in the environment. Although those methods achieve accurate localization, the necessity for installing the hardware is seen as a huge disadvantage from cost, maintanance and complexity perspectives.

Methods that solely rely on conventional Wi-Fi chipsets for indoor localization use measured received signal strength (RSS) levels obtained from the Wi-Fi chipsets. Most of the prior art techniques require training, which includes measuring the RSS levels offline in the indoor environment. These measurements are then supplied to the localization method during online use.

The main limitation associated with the training is in that the offline measurements are unreliable. This is because the RSS levels in the environment vary dynamically over time, for example, due to changes in the number of occupants, the furnishing and locations of the APs. This implies that the training needs to be repeated whenever the environment changes.

U.S. Pat. No. 7,317,419 describes a method for localizing a target device at an unknown location based on the RSS measurements obtained at sensors whose locations are known. The method utilizes a path loss model, where a value of path loss exponent depends on the distances between the transmitter and receiver and some features of the indoor environment.

U.S. Pat. No. 8,077,090 describes a method in which mobile devices report the RSS values to a central server and, if available, a GPS based location estimate. The central server constructs a radio map of an indoor environment. Path loss coefficients, transmitted powers and locations of a number of devices are determined simultaneously by solving a system of equations. The number of access points needs to be large enough to support estimation of large number of parameters.

U.S. Publication 20120129546 uses a difference between the RSS measurements obtained at two consecutive locations to infer the most probable path traversed between these two points. Different constraints on path can be imposed.

U.S. Pat. No. 8,879,607 describes a method that performs indoor localization using the path loss model and RSS measurements at Rake receiver. The receiver extracts the strongest arrival and assigns path loss coefficient corresponding to a free space propagation. There is also a possibility of setting the path loss coefficient corresponding to the strongest arrival based on the type of the building and carrier radio frequency.

U.S. Pat. No. 8,264,402 describes a method that performs indoor localization using the RSS measurements and path loss model. The locations and reference signal levels of the access points are known and used to calibrate path loss coefficients between access points. Thus obtained path loss coefficients are used in some weighted sums to estimate path loss coefficients between an unknown location and access points. The unknown location is finally estimated from the obtained path loss coefficient and measured RSS levels.

Therefore, it is desired to perform RSS based localization in an unsupervised manner, i.e., without training.

SUMMARY OF THE INVENTION

The embodiments of the invention provide a method for localization of a device by measuring received signal strength (RSS) levels of reference signals transmitted by a set of access points (APs) arranged in an enclosed environment. The RSS levels of the reference signals at the APs are known and supplied to the method. The method relies on a conventional Wi-Fi chipset and does not require any changes in that hardware. Also, the method is unsupervised, i.e., the method does not require training.

The method uses a path loss model for the RSS level. The log-distance path loss model is a radio propagation model that predicts path loss a signal encounters in an enclosed environment as a function of distance. According to this model, the RSS level of the received reference signals transmitted by a particular AP depends on a distance to the AP and the associated path loss coefficient. The path loss coefficient is an unknown model parameter. Note that there is a single model parameter for each AP.

Given the RSS levels, the method jointly estimates the path loss coefficients, one for each AP. The procedure uses expectation maximization (EM) where the unknown location is a deterministic unknown parameter. The path loss coefficient is modeled as a discrete random variable, which takes values from a finite alphabet $\mathcal{H}$.

In the basic version, the method is initialized with a uniform distribution of path loss coefficients. However, if the location changes continuously, as is usually the case, the location estimate in a previous time step is used to initialize the estimation during a current time step. In addition, an estimate of the change in location coordinates between two consecutive time steps, along with the location estimate from previous time step, can be used to initialize the current estimation procedure.

The measurement of the change in coordinates between two time instants can be obtained from an inertial measurement unit (IMU), which is nowadays available on most devices. The IMU measures velocity, orientation, and gravitational forces. However, IMUs only collect short term data and suffer from accumulated error.

Finally, one form of non-linear Kalman filtering, which use the location estimate from previous time step and measurement of the change in coordinates (provided by the IMU) is also provided with the goal to achieve better location accuracy by fusing the RSS and IMU measurements in an intelligent fashion.

BRIEF DESCRIPTION OF THE DRAWINGS

FIG. 2B is a pseudo code for the method of FIG. 2A;

FIG. 3C is a pseudo code for the method of FIG. 3B;

FIG. 4B is a pseudo code for the method of FIG. 4A.

DETAILED DESCRIPTION OF THE PREFERRED EMBODIMENTS

Figure 1A:
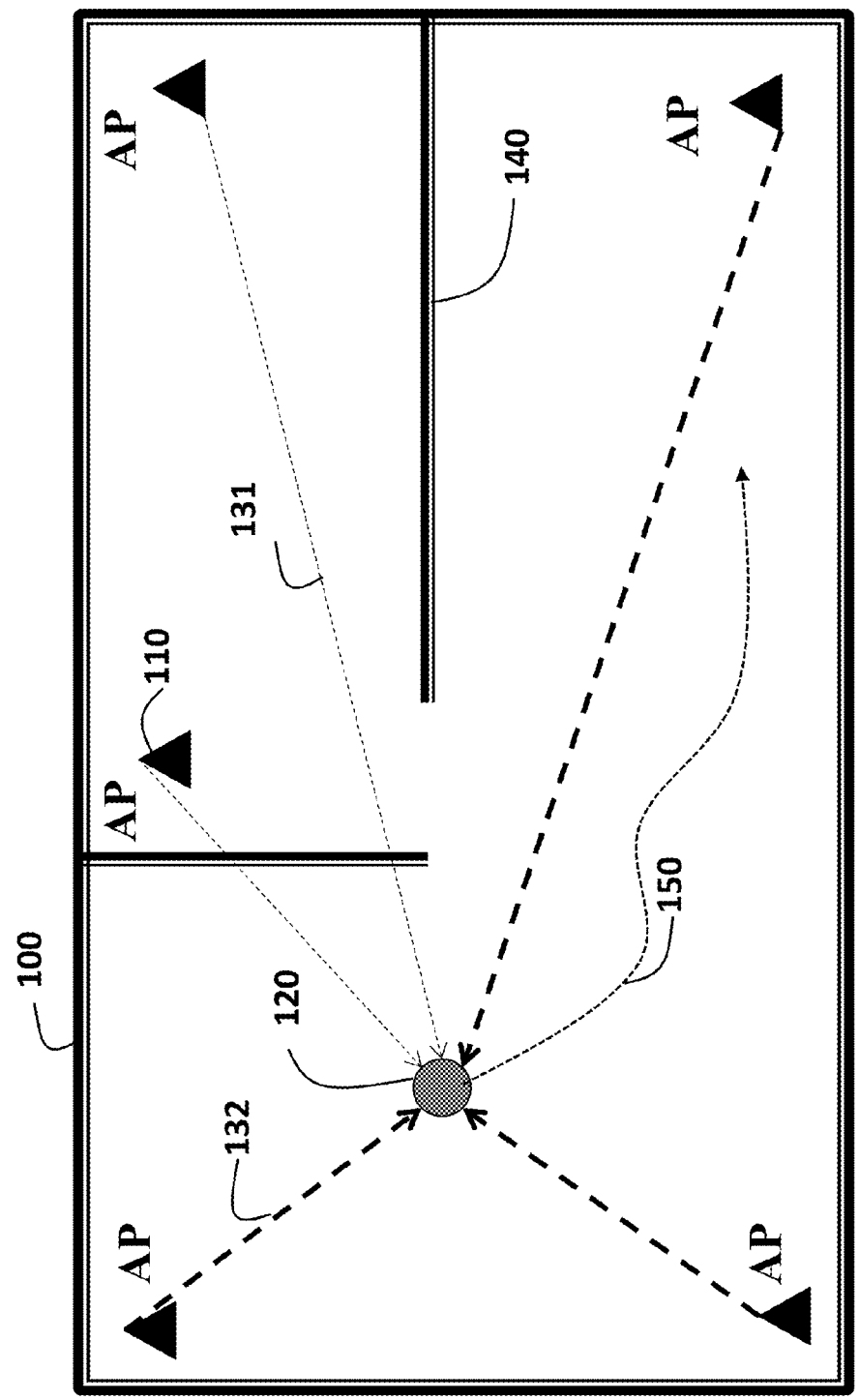
FIGS. 1A and 1B is a schematic of localization problem using RSS measurement according to embodiments of the invention.

The embodiments of our invention provide methods 200, 300, 400 and 500 (see FIGS. 2, 3 and 4) for localization of a device 120 in an enclosed environment 100 using access points APs 110, as shown in FIG. 1A. The enclosed environment can be, for example, interior of a home, building, underground, even an urban canyon, etc., with multiple obstacles such as walls 140, furnishings, etc. The device can be, for example, a mobile robot, smart phone, portable computer, etc. In one embodiment the device moves along an unknown path 150. The device can include a receiver or a transceiver. In one embodiment, the device includes a conventional WiFi chipset and an inertial measurement unit (IMU). The device can also include a processor 290 connected by buses to memory, input/output interfaces, the WiFi chipset and the IMU, as known in the art.

Figure 1B:
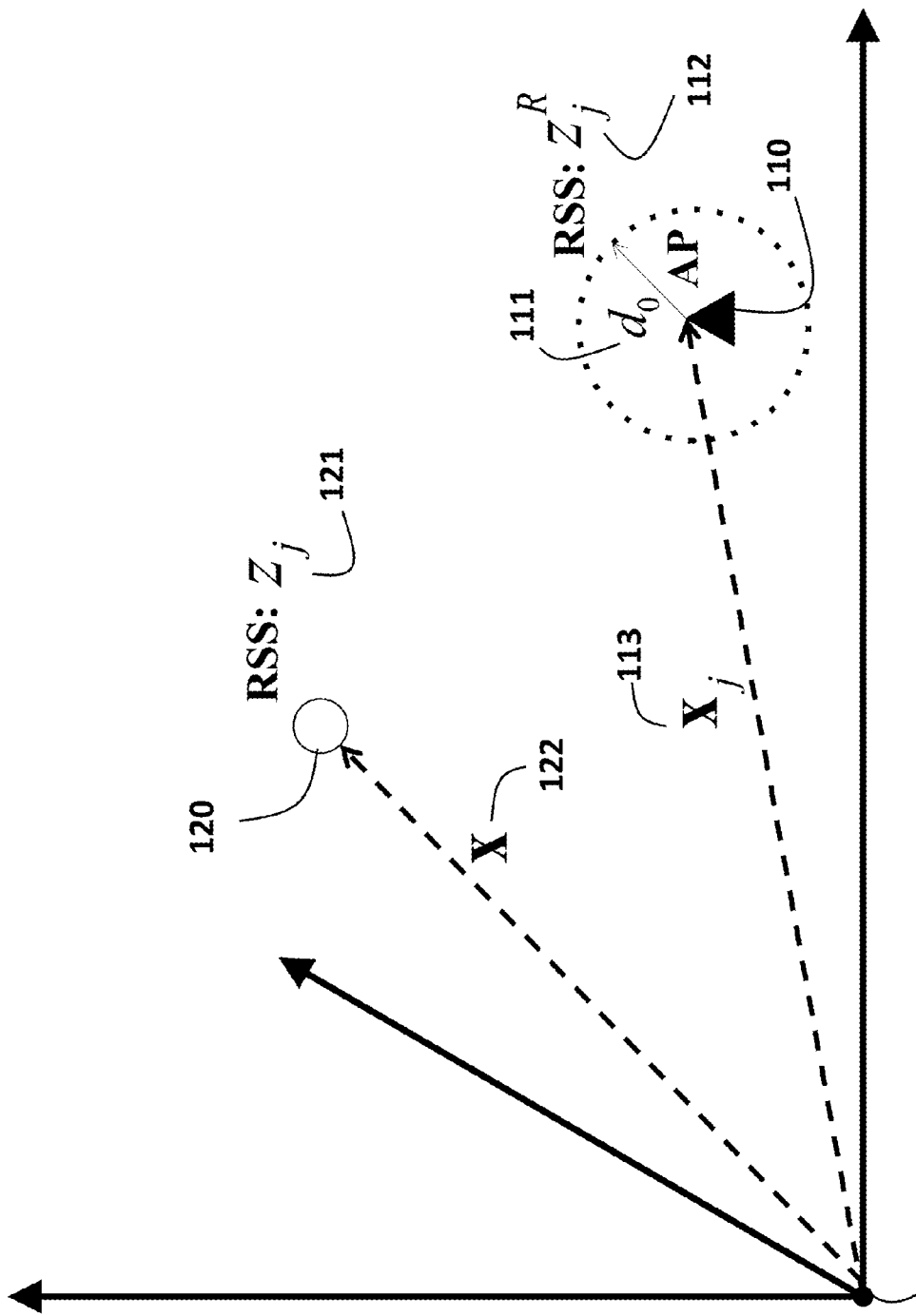

Our methods localize the device 120 using received signal strength (RSS) levels 121 of reference signals transmitted by the APs 110, as shown in FIG. 1B. The reference signals can be transmitted continuously, periodically, or in response to a localization request by the device. The device is located at an unknown location x 122 in an arbitrary coordinate system 160 associated with the enclosed environment. The coordinate system can be two or three dimensional.

A location of the $j^{th}$ AP 110 in this coordinate system is denoted as $x_j$ 113, where j=1, ..., N. The AP j is characterized by reference received signal strength (RSS) level $z_j^R$ 112 at a radial distance $d_0$ 111 from the AP. The locations $x_j$ and the reference RSS levels $z_j^R$ at the distance $d_0$ from the AP are known.

The RSS levels of the reference signals received from access point j by the receiver at some unknown location x 120 are denoted by $z_j$ 121, where j=1, ..., N. A path loss model describes a relation between the RSS measurement $z_j$ and location position x as $$z_j = z_j^R - 10 h_j \log_{10} \frac{\|x - x_j\|}{d_0} + v_j, \quad (1)$$

where $h_j$ is path loss coefficient and $v_j$ is noise. The path loss coefficient quantifies reduction in the RSS level as the distance of the measurement location from the access point increases. In a free space propagation environment, h=2. The path loss coefficient has higher values in more complicated settings such as enclosed environments. The model expressed by equation (1) assumes that there is a single static pathloss coefficient pertaining to each AP and at each location in the environment.

Given the RSS measurements $z_j$, j=1, ..., N, taken at the unknown location x, our goal is to estimate the coordinates of the location x using the path loss model in eq. (1). In the following, we first consider the case when the path loss coefficients are known, and then describe a more realistic case when they are unknown.

Known Path Losses

We assume that noise $v_j$ in equation (1) has a Gaussian distribution with zero mean and variance $\sigma_v^2$. Therefore, the RSS measurement conditioned on path loss coefficient $h_j$, is Gaussian distributed, $$z_j \mid h_j \sim \mathcal{N}\left(z_j^R - 10 h_j \log_{10} \frac{\|x - x_j\|}{d_0}, \sigma_v^2\right). \quad (2)$$

A joint log-likelihood of the RSS levels received from all access points and conditioned on path loss coefficients is given by $$l(z_1, \ldots, z_N \mid h_1, \ldots, h_N) = \quad (3)$$
$$-\frac{1}{\sigma_v^2} \sum_{j=1}^{N} \left(z_j - z_0^R + 10 h_j \log_{10} \frac{\|x - x_j\|}{d_0}\right)^2.$$

where we have used the assumption of independence between RSS measurements from the N access points to obtain the right hand side of equation (3). Hence, the maximum likelihood (ML) location estimate x is $$x = \underset{x}{\operatorname{argmin}} \sum_{j=1}^{N} \left(z_j - z_0^R + 10 h_j \log_{10} \frac{\|x - x_j\|}{d_0}\right)^2. \quad (4)$$

Unknown Path Losses

The path loss coefficients are unknown and location dependent because a single obstacle, e.g., the wall 140 in FIG. 1A, which prevents a direct line-of-sight to an AP can change the corresponding path loss coefficient dramatically (see 131 versus 132 in FIG. 1A). Thus, to estimate an unknown location using the path loss model, the path loss coefficients also need to be inferred.

In general, the path loss coefficient is a continuos variable. However, for the reasons described below, we model the path loss coefficient as a discrete random variable taking values from a finite alphabet $\mathcal{H}$. The probability distribution of the path loss coefficient corresponding to AP j is denoted by $p_j(h)$, where j=1, ..., N and $h \in \mathcal{H}$.

Without loss of generality, we implicitly assume that path loss coefficients corresponding to different APs take values from the same alphabet $\mathcal{H}$. The size of alphabet $\mathcal{H}$ should be large enough such that the measured RSS could be explained with the path loss model in eq. (1). On the other hand, the computational complexity increases with the size of $\mathcal{H}$.

Figure 2A:
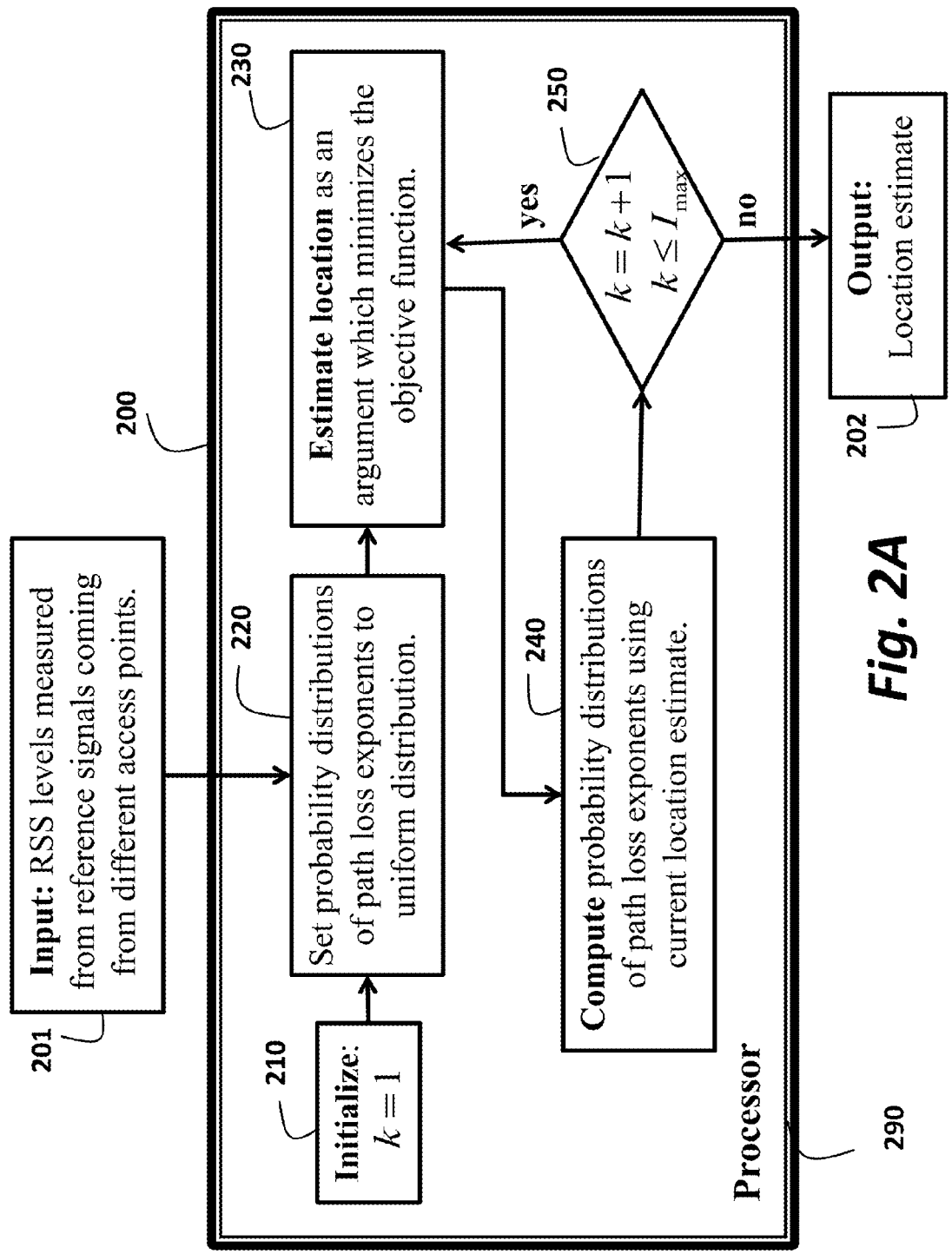
FIG. 2A is a flow diagram of the localization method according to embodiments of the invention.

Given this setup, the EM procedure is used to iteratively estimate path loss coefficients and unknown location. This is performed in the method 200 whose block diagram is shown in FIG. 2A. The input to the method includes the set of measured RSS levels 201 of the reference signals transmitted by the APs. Without any prior information, we initialize the EM procedure with uniform distributions on path loss coefficients $$p_j^{(0)}(h) = \frac{1}{|\mathcal{H}|}, \, h \in \mathcal{H}, \, j = 1, \ldots, N. \quad (5)$$

where $|\mathcal{H}|$ is the cardinality of the finite alphabet. This initialization of the iteration counter k and probability distributions are performed, respectively, in 210 and 220 of FIG. 2A.

The EM procedure consists of iterating between estimating the location using the probability distribution of path loss coefficients in 230, and computing the probability distribution of path loss coefficients using the location estimate in 240. The details of these steps follow.

The estimation step of the $k^{th}$ iteration of the EM procedure evaluates the expectation of the log-likelihood of the measured RSS levels with respect to probability distribution of model parameters, obtained in the previous iteration. Thus, taking the expectation in eq. (3) and treating the path loss coefficients $h_j$ as random variables with distributions $p_j^{(k-1)}$ (h), j=1, . . . , N, evaluated in iteration k−1, the expected joint log-likelihood of the measured RSS levels is given by $$E_{p_j^{(k-1)}(h)}[l(z_1,\ldots,z_N|h_1,\ldots,h_N)] = \qquad (6)$$
$$-\frac{1}{\sigma_v^2}\sum_{j=1}^{N}\sum_{h\in\mathcal{H}} p_j^{(k-1)}(h)\left(z_j - z_0^R + 10h_j\log_{10}\frac{\|x-x_j\|}{d_0}\right)^2.$$

The estimate of the unknown location at iteration k is updated in 230 of FIG. 2A by maximizing the expected log-likelihood in eq. (6), such that $$x^{(k)} = \underset{x}{\text{argmin}} \sum_{j=1}^{N}\sum_{h\in\mathcal{H}} p_j^{(k-1)}(h)\left(z_j - z_j^R + 10h_j\log_{10}\frac{\|x-x_j\|}{d_0}\right)^2. \qquad (7)$$

This optimization problem is solved by using one of the gradient based optimization techniques, e.g., see Bersekas, Nonlinear Programming, Athena Scientific, $2^{nd}$ edition, 1999. Note that the objective function in equation (7) admits closed form expressions for the gradient and a Hessian matrix. The objective function is non-convex. This can be partially overcome by initializing a certain number of optimization procedures with different points and performing the optimization procedures in parallel. After convergence of all of the procedures, the solution that minimizes the objective function is selected as the final estimate.

To compute the probability distribution of path loss coefficient corresponding to AP j, $p_j(h)$, the posterior distribution of path loss coefficient $h_j$, conditioned on the RSS measurement $z_j$, is up to a normalization constant given by the Bayes' rule as $$p_{h_j|z}(h_j|z) \propto p_{z|h_j}(z_j|h_j)p_{h_j}(h), \qquad (8)$$

where $p_{z|h_j}(z_j|h_j)$ is defined in eq. (8) and $p_{h_j}(h)$ is the prior distribution of $h_j$. Recalling the concept of extrinsic information, a uniform prior on path loss coefficient $h_j$ is used in equation (8). Therefore, the probability distribution of the path loss coefficient $h_j$ is, up to the normalization constant, $$p_j^{(k)}(h) \propto \exp\left\{-\frac{1}{2\sigma_v^2}\left(z_j - z_j^R + 10h\log_{10}\frac{\|x^{(k)}-x_j\|}{d_0}\right)^2\right\}, \qquad (9)$$

where $h\in\mathcal{H}$ and j=1, . . . , N. The final estimate of the probability distribution correspondent to path loss coefficient $h_j$ is obtained after normalization. The probability distributions of path loss coefficients are computed in step 240 of FIG. 2A.

The EM procedure is performed until a termination condition is satisfied, e.g., a predefined number $I_{max}$ of iterations is reached. This condition is checked in 250 of FIG. 2A. Alternatively, we can specify a terminations condition for checking when the procedure has converged. For example, the condition is satisfied when a difference between the location estimates obtained in consecutive iterations is less than a predetermined threshold.

Overall, using the measured RSS levels, and the final path loss coefficients, an estimate $\hat{x}$ of the location can be produced. The steps of the method can be performed in the processor of the device. The location estimate is the output 202 from the method, as shown in FIG. 2A.

FIG. 2B shows the corresponding pseudo code for the method 200 with variables and constants as described above.

Consecutive Locations

The localization method described above estimates a single unknown location based on RSS measurements taken at that location. However, it is very likely that the localization requests come from a mobile device in consecutive and relatively densely spaced time instants.

For example as shown in FIG. 1A, a robot 120 moves along the path 150 in the enclosed environment and requires localization frequently, depending on the velocity and complexity of the environment, e.g., number and positions of obstacles 140. If that is the case, then the estimation in current time instant can benefit from using the location estimate from a previous time step.

To incorporate the time in the presented framework, we respectively denote with x(n) and $z_j(n)$ an unknown location and RSS level from the $j^{th}$ AP at a discrete time n. Similarly, $\hat{x}(n)$ is the estimate of the location at time n. The locations of the APs $x_j$ and the corresponding reference signal levels $z_j^R$ are again assumed to be fixed and known.

Initialization Using Previous Location Estimate

Figure 3A:
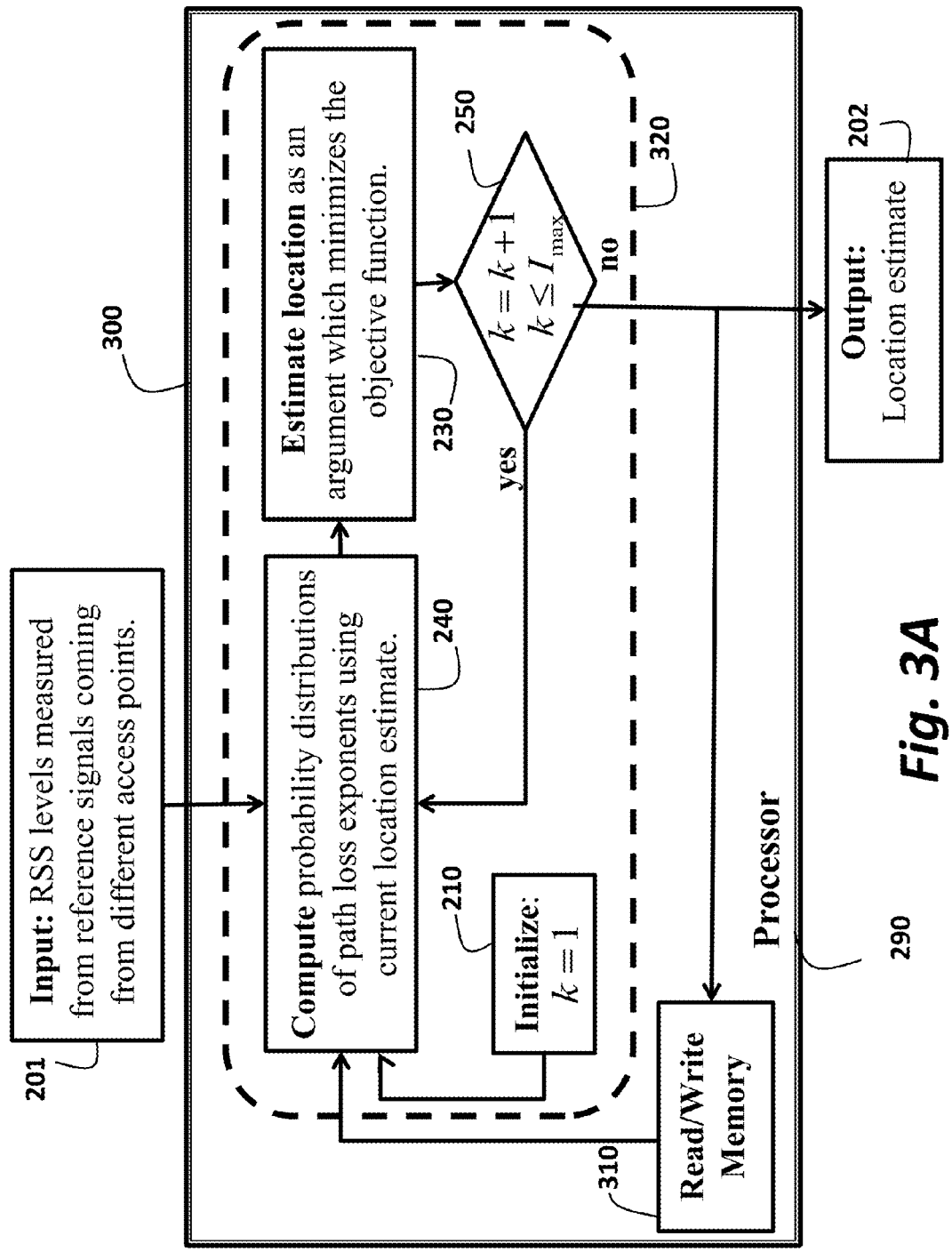
FIGS. 3A and 3B are block diagrams for determining locations with non-uniform initialization.
Figure 3B:
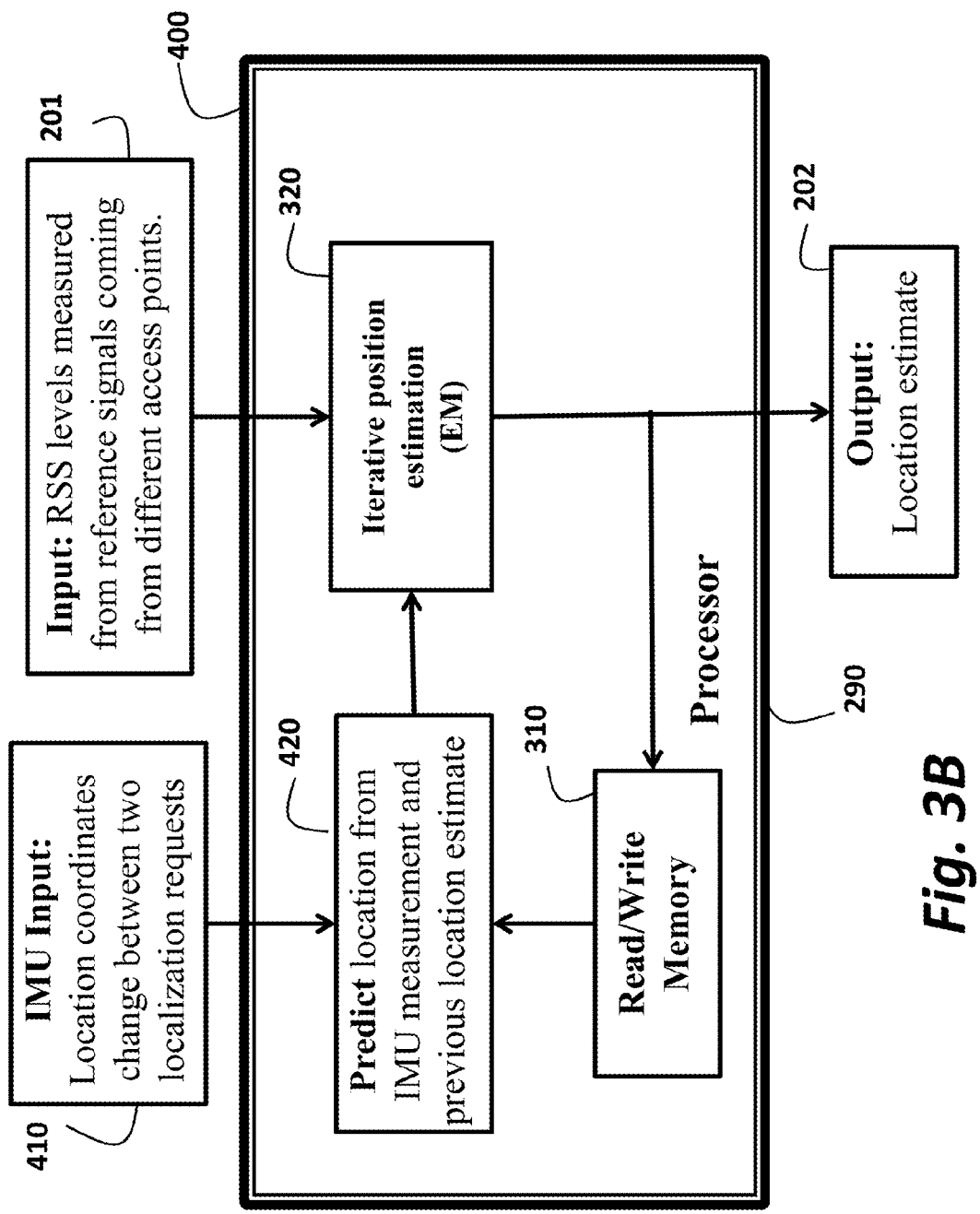

Methods 300 and 400, whose block diagrams are shown in FIGS. 3A and 3B, respectively, directly utilize an estimate of the previous location. Both methods store a location estimate obtained at time n−1 in memory unit 310 and access (read) it for the use in localization at time n.

An immediate consequence of estimating consecutive locations is to use location estimates from previous time instant in order to initialize the distributions of path loss coefficients at a current time instant. Suppose that we are at time n, and have access to estimate $\hat{x}(n-1)$ from time n−1. Then, with the same reasoning as used in deriving eq. (9), the probability distribution of path loss coefficient $h_j$ at time n, is up to the normalization constant initialized with $$p_j^{(0)}(h) \propto \exp\left\{-\frac{1}{2\sigma_v^2}\left(z_j(n) - z_j^R + 10h\log_{10}\frac{\|x(n-1)-x_j\|}{d_0}\right)\right\}, \qquad (10)$$

where $h\in\mathcal{H}$, j=1, . . . , N. Note that we suppress time index n in $p_j^{(0)}(h)$ to simplify the notation. The probability distribution is computed as previously described for step 240. The method 300 further proceeds very much the same as method 200 by iteratively estimating the location in 230, checking the termination criterion in 250, updating the probability distributions of path loss coefficients in 240. The method outputs the final location estimate in step 202.

Another starting point for the EM procedure can be obtained when the measurement of the change in the location coordinates between two consecutive localization requests is available $$\Delta x(n) = x(n) - x(n-1). \qquad (11)$$

Figure 4A:
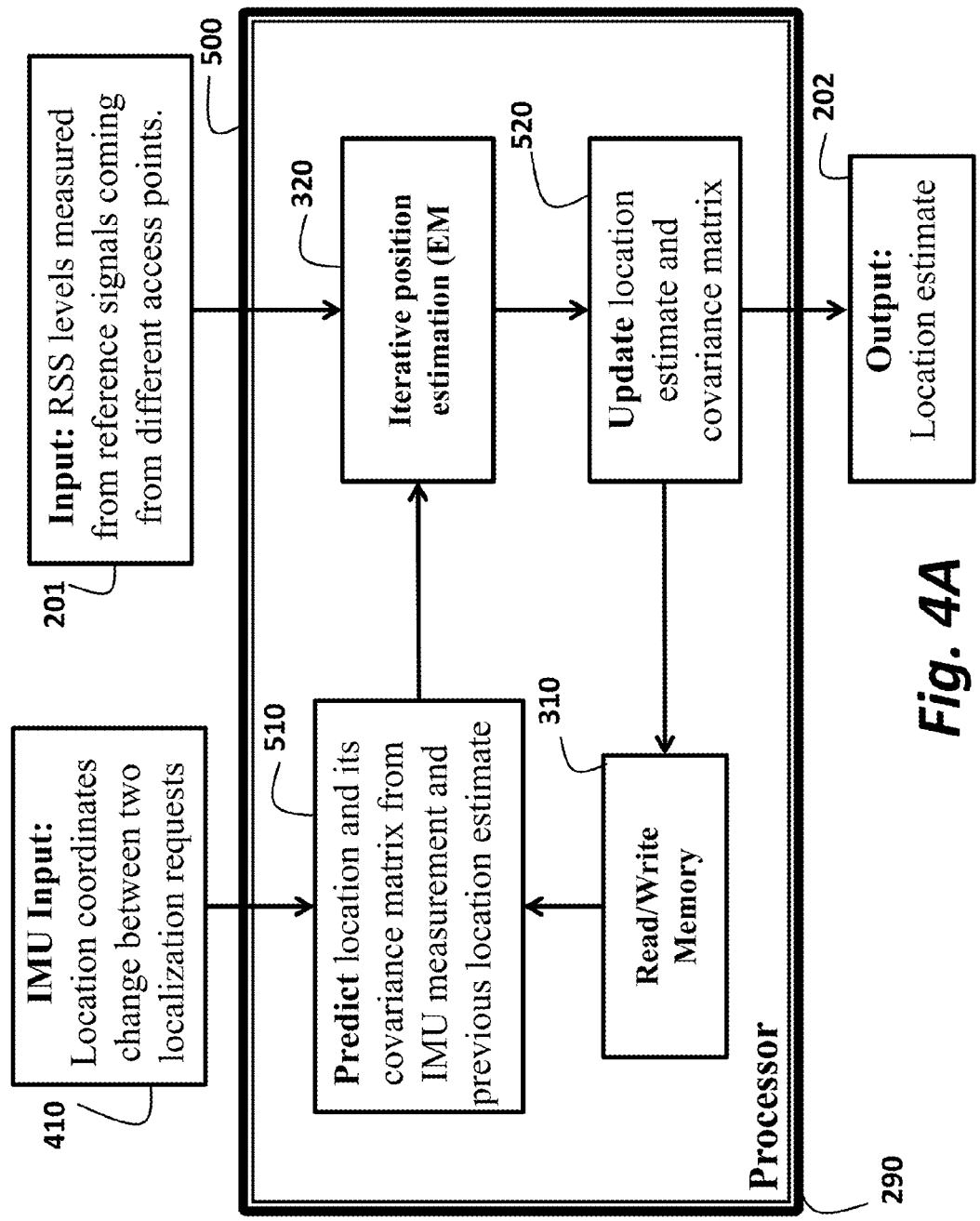
FIG. 4A. is a block diagram for determining locations by filtering consecutive locations.

The coordinate change can be computed from the measurements of the IMU 410, as shown in FIGS. 3B and 4A. However, there are also other ways of measuring the location change.

Using the estimate of the change in location coordinates and the previous location estimate, the current location is first predicted by summing these estimates. This is performed in 420 (FIG. 3B).

Method 400, summarized in FIG. 3B, further proceeds just like method 300. As such, the initial estimate of the probability distribution of path loss coefficient corresponding to AP j, at time n, is up to a normalization constant given by $$p_j^{(0)}(h) \propto \exp\left\{-\frac{1}{2\sigma_v^2}\left(z_j(n) - z_j^R + 10h\log_{10}\frac{\|\hat{x}(n-1) + \Delta x(n) - x_j\|}{d_0}\right)\right\}, \quad (12)$$

where $h \in \mathcal{H}$, $j=1, \ldots, N$. These distributions are computed in 320 (more precisely in 230 within 320). Other steps inherent to the basic EM procedure are also executed in corresponding blocks in 320. The method outputs the final location estimate in 202.

As shown in the pseudocode in FIG. 3C, after the initialization stage, the localization method follows the same steps as described above. This method uses the IMU estimate $\Delta x(n)$ for initialization. The final location estimate is obtained after a predefined number of iterations or after the conditions of a stopping criterion are fulfilled and the method is terminated.

Processing Consecutive Estimates

The above method uses the IMU estimate of the change in location coordinates to initialize probability distributions of path loss coefficients. The IMU estimate can also be used to formulate a linear model for dynamics of the locations, $$x(n) = x(n-1) + \Delta x(n) + q(n), \quad (13)$$

where $q(n)$ is an additive white Gaussian noise which models the IMU estimation error. We assume the error has a zero mean and a variance $\sigma_0^2$ in each coordinate direction.

The location estimate obtained in one of the previously described methods can be viewed as a noisy observation of the true location, i.e., $$\hat{x}(n) = x(n) + e(n), \quad (14)$$

where $e(n)$ is the estimation error. We approximate the estimation error with zero-mean multivariate Gaussian distribution and evaluate its covariance matrix $K(n)$.

Hence, using the linear model for the dynamics of the location coordinates in (13) and (approximated) Gaussian observation model in eq. (14), the location estimates are further processed by applying a linear Kalman filter. Suppose that the final location estimate and the covariance matrix at time $n-1$, obtained from Kalman filter, are respectively $x_f(n-1)$ and $\Sigma(n-1)$. Our goal is to refine the estimate $\hat{x}(n)$ obtained from the EM procedure 320, and produce the final location estimate $x_f(n)$ and covariance matrix $\Sigma(n)$. Note that $x_f(n)$ and $\Sigma(n)$ are, respectively, the mean and covariance matrix of the Gaussian posterior distribution of the location $x(n)$, conditioned on $x(1), \ldots, x(n-1)$.

The joint EM-Kalman filtering method 500, whose block diagram is shown in FIG. 4A, proceeds as follows. First, given the final location estimate $x_f(n-1)$ and covariance matrix $\Sigma(n-1)$ from the previous time, $n-1$, stored in memory unit 310, the predicted location and covariance matrix at time n are respectively $$\tilde{x}(n) = x_f(n-1) + \Delta x(n) \quad (15)$$

$$\tilde{\Sigma}(n) = \Sigma(n-1) + \sigma_0^2 I, \quad (16)$$

Then, using the RSS level $z_j(n)$, $j=1, \ldots, N$, location estimate and hard estimates of path loss coefficients Note that the probability distributions are initialized using predicted location (n), evaluated in eq. (1). The provisional location estimate and hard estimates of path loss coefficients are used to evaluate The updated location estimate, i.e., the final location estimate, and covariance matrix are finally obtained as $$x_f(n) = \tilde{x}(n) + (\hat{x}(n) - \tilde{x}(n))(\tilde{\Sigma}(n) + K(n))^{-1}\tilde{\Sigma}(n), \text{ and} \quad (17)$$

$$\Sigma(n) = \tilde{\Sigma}(n) - \tilde{\Sigma}(n)(\tilde{\Sigma}(n) + K(n))^{-1}\tilde{\Sigma}(n). \quad (18)$$

The statistics of the estimation error $e(n)$ and final location estimate and its covariance matrix are computed in 520.

The method outputs the final location estimate in 202.

FIG. 4B shows the corresponding pseudo code with variables and constants as described above.

Note that we have implicitly assumed $n>1$ in the description of method 500. However, for the first localization request when $n=1$, the EM procedure can be initialized with uniform distributions on path loss coefficients, just as in method 200 of FIG. 2A. The final location estimate is the estimate obtained from the EM procedure, i.e., $x_f(1) = \hat{x}(1)$, while the covariance matrix $\Sigma(1)$ is equal to the covariance matrix of the estimation error $e(n)$, $K(n)$, evaluated using $\hat{x}(1)$ and the corresponding hard estimates of path loss coefficients.

Method for Computing the Statistics of the Estimation Error

We first recall that $\hat{x}(n)$ is the ML estimate of the unknown location $x(n)$. The statistics of noise process $e(n)$ can be approximated using an asymptotic characterization of the ML estimation error. Assume an observation model $p_y(y; x)$, where x is an unknown parameter that we infer from M i.i.d. measurements $y_1, \ldots, y_m$ using the ML approach. Under some conditions, usually satisfied in practice, as $M \to \infty$, $\sqrt{M}(x - \hat{x}_{ML}) \to \mathcal{N}(0, \sigma^2)$ in distribution, where $$\sigma^{-2} = -E\left[\frac{\partial^2}{\partial x^2}\log p(y_1, \ldots, y_M; x)\right]_{x=\hat{x}_{ML}}.$$

Using this result, the estimation error $e(n)$ is approximated using an observation matrix or Laplace approximation as a zero mean Gaussian random vector whose covariance matrix $K(n)$ is given by the inverse of the observed information matrix $$J = -\frac{\partial^2}{\partial x^2} l(z_1(n), \ldots, z_N(n) | h_1(n), \ldots, h_N(n)), \quad (19)$$

where $l(z_1(n), \ldots, z_N(n) | h_1(n), \ldots, h_N(n))$ is the joint log-likelihood, defined in eq. (3). The joint log-likelihood is evaluated at $\hat{x}(n)$ and for hard estimates of the path loss coefficients $\hat{h}_1(n), \hat{h}_N(n)$, obtained from the EM procedure 320. These path loss coefficients are hard estimates obtained from the corresponding probability distributions. Note that the information matrix eq. (19) is essentially the Hessian matrix of the negative joint log-likelihood.

Alternative Method for Computing Estimation Error Statistics

Alternatively, the statistics of the estimation error $e(n)$ can be approximated by treating unknown location $x(n)$ as a random vector, whose posterior distribution given the measured RSS level $z_j$ of the reference signal transmitted from the AP j and assuming that path loss coefficient $h_j$ is known (or estimated accurately), is up to the normalization constant given by $$P(x|z_j) \propto p(z_j|x)p(x), \qquad (20)$$

where p(x) is the prior distribution of the unknown location. We assume that p(x) has uniform distribution over the enclosed environment because either (i) we do not have any prior information of the position of the device or (ii) information about previous location is already included in the prediction step in eq. (15) and (16). On the other hand, likelihood $p(z_j|x)$ is Gaussian distributed with mean x and variance $\sigma_v^2$, as specified in eq. (2). Therefore, the posterior in eq. (20) is a multivariate Gaussian distribution with mean x and variance $\sigma_v^2$ in each coordinate direction, and truncated within the boundaries of the enclosed environment. This distribution is known in art as a truncated Gaussian distribution. This conclusion is easily generalized to the case when the device receives reference signals from N APs.

Overall, the estimation error e(n) made by estimating unknown location x(n) with $\hat{x}(n)$ is distributed according to a multivariate Gaussian distribution with zero mean, covariance matrix $\sigma_v^2 I$, and truncated within the enclosed environment. In principle, the covariance matrix of the truncated Gaussian distribution can be evaluated. However, for simplicity, we approximate the covariance matrix with the covariance matrix of the untruncated Gaussian distribution. To conclude, the estimation error e(n) is therefore approximated with a multivariate Gaussian distribution of zero mean and covariance matrix $\sigma_v^2 I$.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a location of a device, comprising steps:
    measuring, in a receiver of the device, received signal strength (RSS) levels of reference signals transmitted by a set of access points (APs) arranged in an enclosed environment;
    initialize an expectation maximization procedure with a uniform distribution of path loss coefficients of the set of APs;
    evaluating an expectation of a joint log-likelihood of the RSS levels with respect to the uniform probability distribution of the path loss coefficients;
    updating the uniform distribution of the path loss coefficients;
    repeating the evaluating and the updating until a termination condition is satisfied to produce final path loss coefficients; and
    determining the location of the device based on the RSS levels and the final path loss coefficients, wherein the steps are performed in processor of the device.

2. The method of claim 1, wherein the device includes a conventional WiFi chipset.

3. The method of claim 1, wherein the device includes an inertial measurement unit (IMU).

4. The method of claim 1, wherein the locations and RSS levels at the distance $d_0$ from the set of APs are known.

5. The method of claim 1, wherein the path loss coefficient take values from a finite alphabet $\mathcal{H}$.

6. The method of claim 1, further comprising:
    measuring the RSS levels at consecutive locations, and
    initializing the uniform distribution of path loss coefficients using estimates of a previous location.

7. The method of claim 1, further comprising:
    initializing the uniform distribution of path loss coefficients using an inertial measurement unit (IMU).

8. The method of claim 1, further comprising:
    formulating a linear model for dynamics of the locations.

9. The method of claim 6, further comprising:
    applying a Kalman filter to the consecutive locations.

10. The method of claim 1, further comprising:
    approximating an error in the location estimate with a zero-mean multivariate truncated Gaussian distribution and approximating a covariance matrix of the multivariate truncated Gaussian distribution with a diagonal matrix.

11. The method of claim 1, further comprising:
    approximating an error in the location estimate with a zero-mean multivariate Gaussian distribution and evaluating a covariance matrix of the multi-variate Gaussian distribution as an inverse of an observed information matrix.

12. A device, comprising:
    a receiver configure to measure received signal strength (RSS) levels of reference signals transmitted by a set of access points (APs) arranged in an enclosed environment; and
    a processor configured to initialize an expectation maximization procedure with a uniform distribution of path loss coefficients of the set of APs, and for evaluating an expectation of a joint log-likelihood of the RSS levels with respect to the uniform probability distribution of the path loss coefficients, and for updating the uniform distribution of path loss coefficients, wherein the evaluating and the updating until a termination condition is satisfied, and
wherein the location of the device is based on the RSS levels and the final path loss coefficients.

* * * * *